US012617368B2

(12) United States Patent
Sontag et al.

(10) Patent No.: US 12,617,368 B2
(45) Date of Patent: May 5, 2026

(54) SEAT BELT BUCKLE ASSEMBLIES FOR USE WITH A SEAT BELT OF A VEHICLE

(71) Applicant: Toyota Motor Engineering & Manufacturing North America, Inc., Plano, TX (US)

(72) Inventors: Tiffany M. Sontag, Milan, MI (US); Ryan M. Mahn, Lambertville, MI (US); Mark D. Clauser, Saline, MI (US); Juliana M. Said, Chelsea, MI (US); Yi-Ru C. Sosnowski, Ann Arbor, MI (US)

(73) Assignees: TOYOTA MOTOR ENGINEERING & MANUFACTURING NORTH AMERICA, INC., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/932,834

(22) Filed: Oct. 31, 2024

(65) Prior Publication Data

US 2026/0116336 A1 Apr. 30, 2026

(51) Int. Cl.
B60R 21/055 (2006.01)
B60R 22/16 (2006.01)
(Continued)

(52) U.S. Cl.
CPC ............ B60R 22/16 (2013.01); B60R 21/055 (2013.01); B60R 22/28 (2013.01); *B60R 2022/1806* (2013.01); *B60R 2022/286* (2013.01)

(58) Field of Classification Search
CPC ....... B60R 21/055; B60R 22/12; B60R 22/16; B60R 22/18; B60R 22/28;
(Continued)

(56) References Cited

U.S. PATENT DOCUMENTS

| 6,793,032 B2 | 9/2004 | Lichtinger et al. |
| 6,840,544 B2 | 1/2005 | Prentkowski |

(Continued)

FOREIGN PATENT DOCUMENTS

| CN | 120936518 A | * 11/2025 | ............. B60R 22/26 |
| DE | 102012107294 A1 | * 2/2013 | ............. B60R 22/26 |

(Continued)

OTHER PUBLICATIONS

Description Translation for JP 2008213679 from Espacenet (Year: 2008).*

(Continued)

*Primary Examiner* — Jason D Shanske
*Assistant Examiner* — Daniel M. Keck
(74) *Attorney, Agent, or Firm* — Dinsmore & Shohl LLP

(57) ABSTRACT

A seat belt buckle assembly for use with a seat belt of a vehicle includes a bracket having a first portion configured to be fixed to a chassis of the vehicle and a second portion extending from the first portion away from the chassis. The seat belt buckle assembly further includes a buckle mounted to the second portion of the bracket and configured to selectively couple with a tongue of the seat belt. The bracket is configured to restrains motion of the buckle during a vehicle event. The seat belt buckle assembly further includes a receptacle defining an aperture extending therethrough, with the buckle at least partially disposed within the aperture and held by the receptacle for spatially locating the buckle within the vehicle.

19 Claims, 3 Drawing Sheets

(51) Int. Cl.
*B60R 22/18* (2006.01)
*B60R 22/28* (2006.01)

(58) Field of Classification Search
CPC .... B60R 2022/1806; B60R 2022/1812; B60R
2022/286
USPC ............................................... 280/801.1, 805
See application file for complete search history.

(56) References Cited

U.S. PATENT DOCUMENTS

| | | | |
|---|---|---|---|
| 2005/0155193 A1* | 7/2005 | Bell ........................ | B60R 22/18 |
| | | | 24/302 |
| 2008/0143093 A1 | 6/2008 | Kojima et al. | |
| 2011/0148081 A1* | 6/2011 | Smith .................... | B60R 21/20 |
| | | | 280/733 |
| 2019/0351796 A1* | 11/2019 | Yang ..................... | B60N 2/688 |

FOREIGN PATENT DOCUMENTS

| | | | |
|---|---|---|---|
| JP | 2006051856 A | | 2/2006 |
| JP | 2008213679 A | | 9/2008 |
| JP | 2024024458 A | * | 2/2024 |

OTHER PUBLICATIONS

Description Translation for DE102012107294 from Espacenet (Year: 2012).*

* cited by examiner

SEAT BELT BUCKLE ASSEMBLIES FOR USE WITH A SEAT BELT OF A VEHICLE

TECHNICAL FIELD

The present specification generally relates to seat belt buckle assemblies for use with a seat belt of a vehicle and, more specifically, seat belt buckle assemblies having a bracket for mounting to a chassis of a vehicle.

BACKGROUND

Seat belts utilized in vehicles commonly provide a buckle that selectively couples a tongue of the seat belt thereto for securing an occupant within a vehicle seat. Traditionally, the buckle is attached to the vehicle chassis by a length of webbing. The webbing is typically formed of a material having a tensile strength sufficient for retaining the occupant within the seat during a crash event, aggressive braking and handling, etc. However, the webbing may allow for relative movement between buckle and the vehicle chassis before and during such an event, which may limit some of the effectiveness of the seat belt.

Accordingly, a need exists for alternative seat belt buckle assemblies for use with a seat belt of a vehicle.

SUMMARY

In one embodiment, a seat belt buckle assembly for use with a seat belt of a vehicle includes a bracket having a first portion configured to be fixed to a chassis of the vehicle and a second portion extending from the first portion away from the chassis. The seat belt buckle assembly further includes a buckle mounted to the second portion of the bracket and configured to selectively couple with a tongue of the seat belt. The bracket is configured to restrain motion of the buckle during a vehicle event. The seat belt buckle assembly further includes a receptacle defining an aperture extending therethrough, with the buckle at least partially disposed within the aperture and held by the receptacle for spatially locating the buckle within the vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
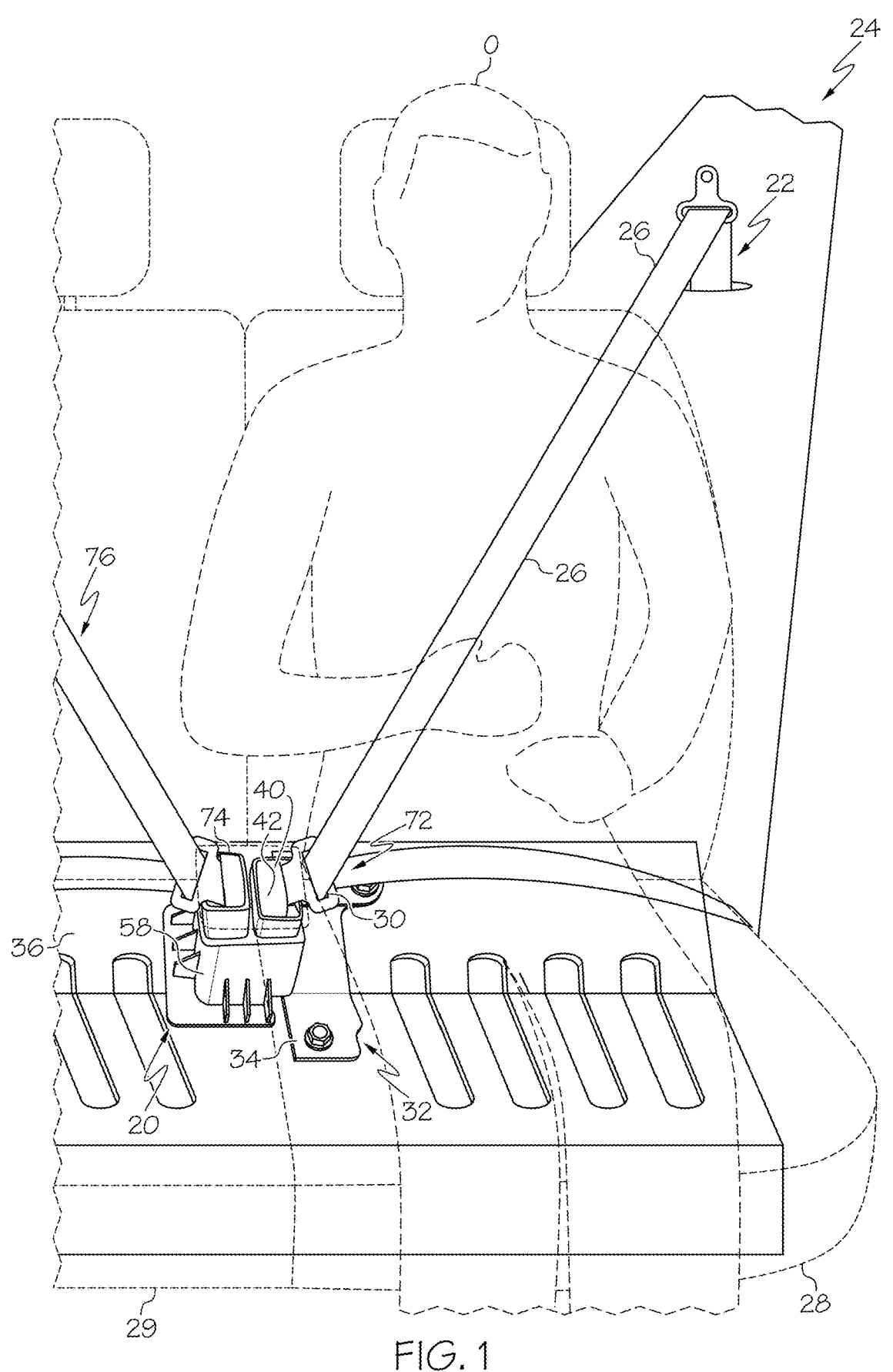
FIG. 1 schematically depicts a perspective view of a vehicle having a seat belt and a seat belt buckle assembly, according to one or more embodiments shown and described herein.

FIG. 1 generally depicts a seat belt buckle assembly for use with a seat belt of a vehicle. The seat belt buckle assembly includes a bracket having a first portion configured to be fixed to a chassis of the vehicle and a second portion extending from the first portion away from the chassis. The seat belt buckle assembly further includes a buckle mounted to the second portion of the bracket and configured to selectively couple with a tongue of the seat belt. The seat belt buckle assembly further includes a receptacle defining an aperture extending therethrough, with the buckle at least partially disposed within the aperture.

Previous seat belt buckle assemblies utilize webbing to attach buckles to the vehicle chassis. However, the webbing may allow for relative movement between the buckle and the vehicle chassis before and during a vehicle event (such as a crash event, aggressive braking and handling, etc.) which limits some of the effectiveness of the seat belt. The embodiments described herein overcome these limitations by utilizing the bracket, which is configured to restrain motion of the buckle during a vehicle event. Furthermore, the buckle is held by the receptacle for spatially locating the buckle within the vehicle. Various embodiments and benefits of the seat belt buckle assembly, and the operation of the seat belt buckle assembly, will be described in more detail herein.

Referring now to FIG. 1, a seat belt buckle assembly 20 in accordance with one or more embodiments of the present disclosure is shown. The seat belt buckle assembly 20 may be used with a seat belt 22 of a vehicle 24. More specifically, the seat belt 22 may include a belt webbing 26 that is fixed to the vehicle 24 and configured to selectively extend across an occupant O disposed within a seat 28 of the vehicle 24. The belt webbing 26 may have a tensile strength suitable for retaining the occupant O within the seat 28 during a vehicle event. The vehicle event may include any acceleration of the vehicle 24 that causes the occupant O to move relative to the seat 28. The vehicle event may include, but is not limited to, aggressive braking and handling, impact with another object, and a vehicle rollover. The belt webbing 26 may be flexible to allow ingress and egress of the occupant O relative to the seat 28 and to accommodate contours of the occupant O and movement of the occupant O. The seat belt 22 may further include a tongue 30. The tongue 30 may be configured to selectively couple with the seat belt buckle assembly 20. In doing so, the seat belt 22 selectively traverses the occupant O forming a barrier to reduce movement of the occupant O relative to the vehicle 24 during a vehicle event.

Figure 2:
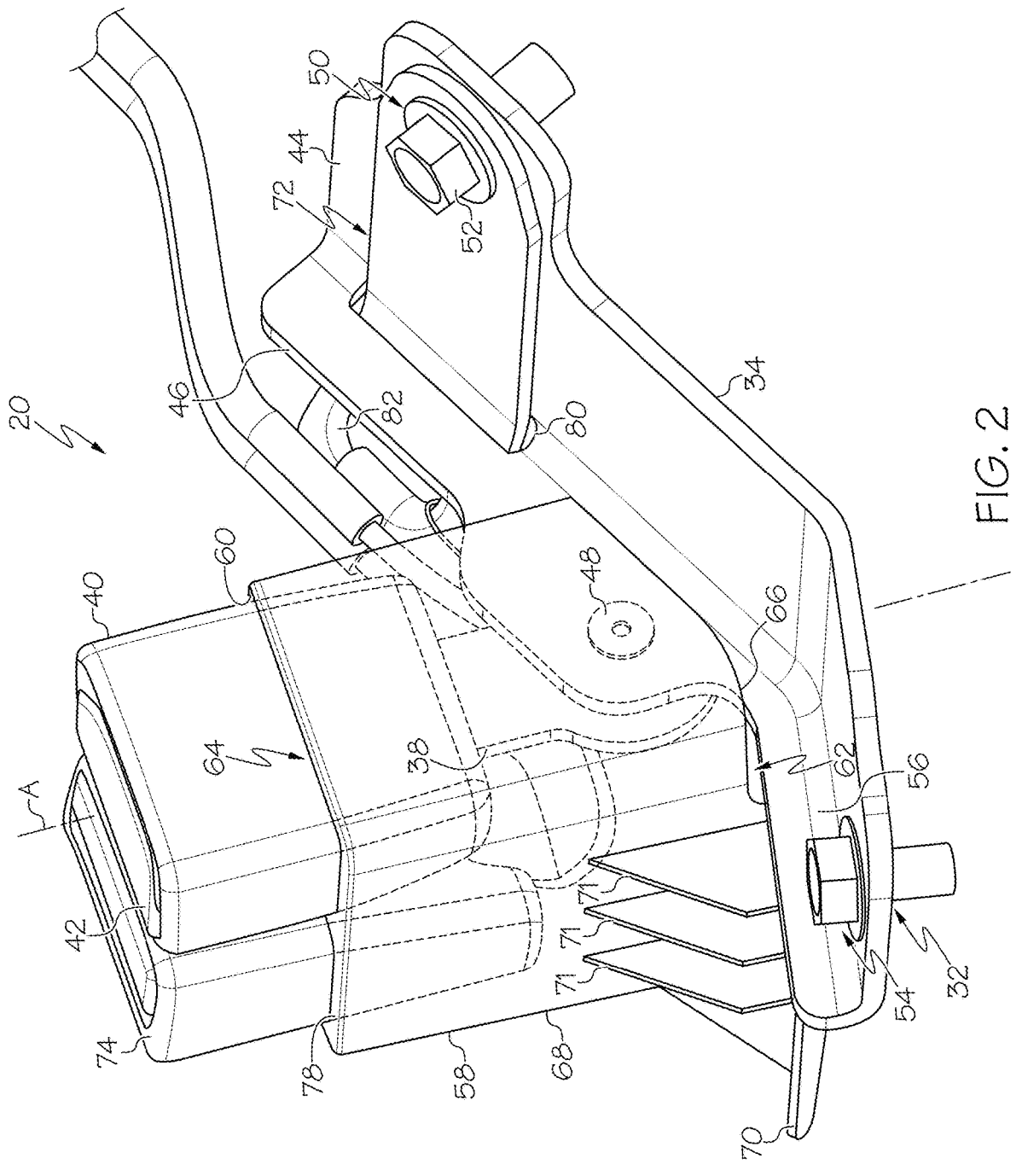
FIG. 2 schematically depicts a perspective view of the seat belt buckle assembly of FIG. 1, according to one or more embodiments shown and described herein.
Figure 3:
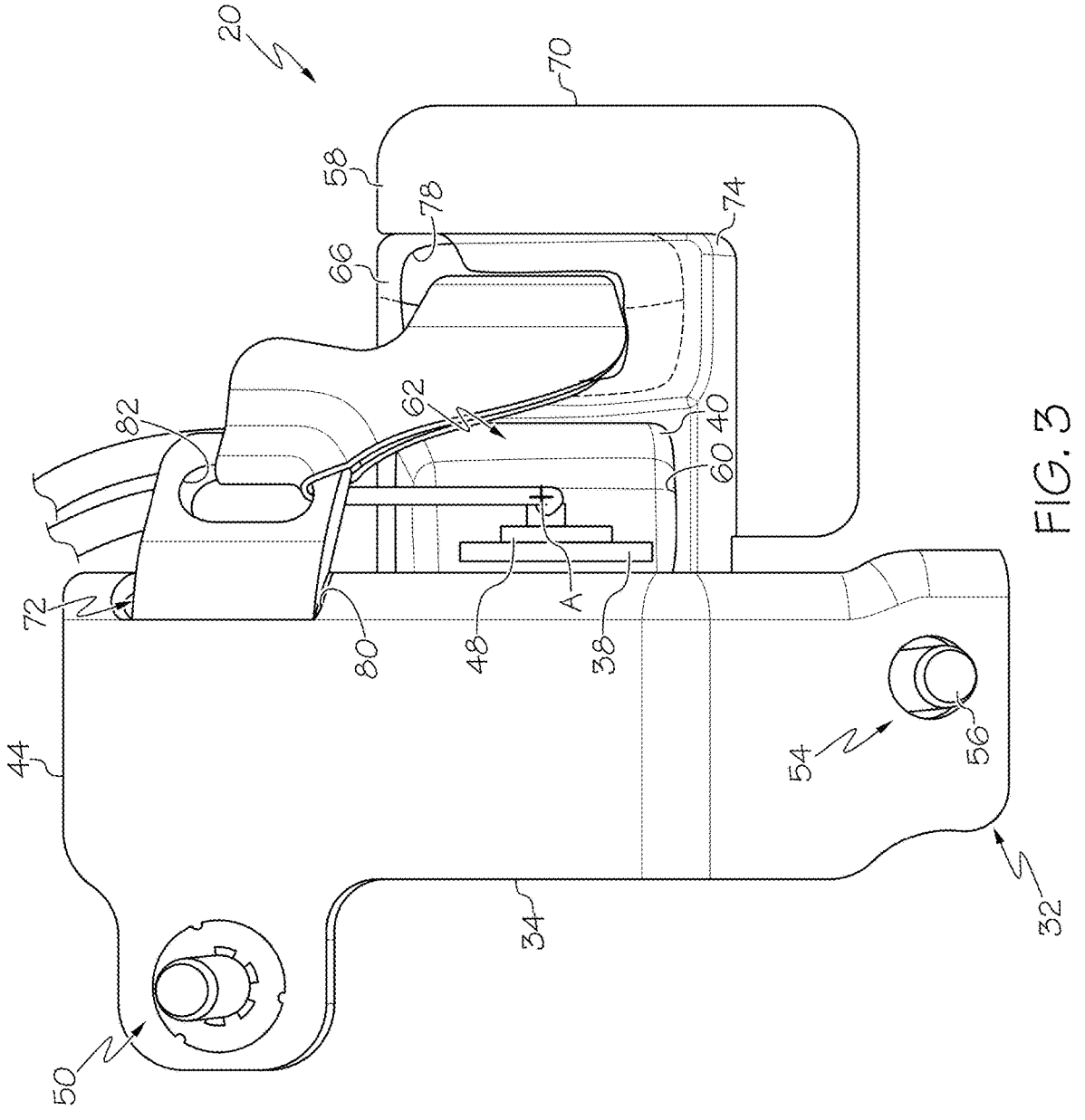
FIG. 3 schematically depicts a bottom elevational view of the seat belt buckle assembly of FIG. 1, according to one or more embodiments shown and described herein.

With reference to FIGS. 2 and 3, the seat belt buckle assembly 20 may include a bracket 32 having a first portion 34 configured to be fixed to a chassis 36 of the vehicle 24 and a second portion 38 extending from the first portion 34 away from the chassis 36. Accordingly, the second portion 38 of the bracket 32 may extend upwardly from the first portion 34 of the bracket 32 and the chassis 36.

The seat belt buckle assembly 20 may further include a buckle 40 mounted to the second portion 38 of the bracket 32 and configured to selectively couple with the tongue 30 of the seat belt 22, as shown in FIGS. 1 and 2. The buckle 40 may include a button 42 that may be selectively actuated by the occupant O to release the tongue 30 from the buckle 40 and allow the occupant O to remove the seat belt 22 from thereacross the occupant O. It is to be appreciated that the buckle 40 may be configured to have any suitable manner of retaining and releasing the tongue 30 of the seat belt 22.

The bracket 32 is configured to restrain motion of the buckle 40 during a vehicle event. More specifically, the bracket 32 may be formed from a metal (such as steel), a composite, or any other suitable material that allows the bracket 32 to be rigid during normal operation (e.g., movement of the vehicle 24 along a road surface in controlled manner). Furthermore, the rigid construction of the bracket 32 ensures that the buckle 40 is positioned to maintain proper positioning of the seat belt 22 across a lap of the occupant O. The bracket 32 may also be deformable (e.g., ductile and bendable) under high load conditions, such as during a vehicle event. As such, the bracket 32 may deform during the vehicle event as the occupant O loads the seat belt 22. The deformation of the bracket 32 may in-turn absorb at least some of the energy from the movement of the occupant O to reduce a sudden, high acceleration on the occupant O, which can cause injury.

With reference to FIGS. 2 and 3, the first portion 34 of the bracket 32 may include a flange 44 configured to lie along the chassis 36 and support the buckle 40. Said another way, the flange 44 of the first portion 34 may have a generally plate-like configuration that is contoured to lie flat along the chassis 36. The first portion 34 may further include a lip 46 extending generally orthogonal to the flange 44, as shown in FIG. 2. The lip 46 may provide rigidity to retain the contour of the flange 44 along the chassis 36.

In the embodiment shown in FIGS. 2 and 3, the first portion 34 and the second portion 38 of the bracket 32 are two separate components that are joined together by a rivet 48. It is to be appreciated that the first portion 34 and the second portion 38 may be joined together in any suitable manner, including, but not limited to, mechanical fasteners, welding, and chemical bonding. In other embodiments, the first portion 34 and the second portion 38 may be formed of a single, monolithic component. It is to be appreciated that the first portion 34 and the second portion 38 of the bracket 32 may be formed of any number of components.

The buckle 40 and the second portion 38 of the bracket 32 may be aligned along an axis A. The flange 44 of the first portion 34 of the bracket 32 may extend laterally from the axis A. The first portion 34 of the bracket 32 may further include a fastener interface 50 laterally spaced from the axis A and configured to fix the bracket 32 to the chassis 36. Accordingly, the fastener interface 50 may be offset from the axis A and disposed on the flange 44. In the embodiment shown in FIGS. 2 and 3, the fastener interface 50 may define a hole with the seat belt buckle assembly 20 further including a fastener 52 configured to extend through the hole to secure the first portion 34 of the bracket 32 to the chassis 36. The fastener 52 may include a bolt, machine screw, or any other suitable mechanical fastener. Furthermore, the fastener interface 50 may comprise any other suitable configuration for securing the first portion 34 of the bracket 32 to the chassis 36, such as a weld joint, an interference-fit connection, etc.

The first portion 34 of the bracket 32 may further include a second fastener interface 54. The second fastener interface 54 may be laterally spaced from the axis A and configured to fix the bracket 32 to the chassis 36. Moreover, the second fastener interface 54 may be laterally spaced from the fastener interface 50. Accordingly, the second fastener interface 54 may be offset from the fastener interface 50 and the axis A and disposed on the flange 44. The second fastener interface 54 may be constructed in any suitable manner to fix the bracket 32 to the chassis 36, including in a manner similar to the fastener interface 50 described above. As such, the second fastener interface 54 may define a hole with the seat belt buckle assembly 20 further including a fastener 56 configured to extend through the hole to secure the first portion 34 of the bracket 32 to the chassis 36.

The offset of the buckle 40 and the second portion 38 of the bracket 32 (disposed along the axis A) from the fastener interface 50 and/or the second fastener interface 54 allows the buckle 40 to exert bending moment on the first portion 34 of the bracket 32 about the fastener interface 50 and/or the second fastener interface 54 during a vehicle event. As such, at least the first portion 34 of the bracket 32 may deform to absorb energy from the vehicle event. However, during normal operation of the vehicle 24, the bracket 32 has a strength sufficient to maintain the positioning of the bracket 32 and the buckle 40 relative to the fastener interface 50 and/or the second fastener interface 54.

The seat belt buckle assembly 20 may further include a receptacle 58 defining an aperture 60 extending therethrough. The buckle 40 may be at least partially disposed within the aperture 60 and held by the receptacle 58 for spatially locating the buckle 40 within the vehicle 24. For example, the receptacle 58 may be positioned between the seat 28 and another seat 29 adjacent the seat 28, with the receptacle 58 configured to engage the seats 28, 29 and maintain spacing between the buckle 40 and the seats 28, 29. Said another way, the receptacle 58 may prevent the buckling becoming buried between the seats 28, 29, ensuring ease of access and use by the occupant O. The receptacle 58 may also prevent the buckle 40 from moving into contact with other rigid components during operation of the vehicle 24, which may result in noise, vibration, and harshness (NVH).

The buckle 40 and the receptacle 58 have an interference fit within the aperture 60. More specifically, the aperture 60 of the receptacle 58 and the buckle 40 may have corresponding configurations (e.g., size and shape) that allow for a tight fit of the receptacle 58 around the buckle 40, which retains the buckle 40 within the aperture 60. In doing so, movement of the buckle 40 relative to the receptacle 58 is reduced, further preventing NVH from propagating therebetween.

The receptacle 58 may comprise a polymer. More specifically, may comprise an elastomer. However, the receptacle 58 may be a metal, a composite, or any other suitable material for retaining the buckle 40.

The aperture 60 may extend between a first end 62 and a second end 64 of the receptacle 58. The second portion 38 of the bracket 32 may extend into the receptacle 58 from the first end 62. Accordingly, during assembly, the receptacle 58 may be slid over the buckle 40 and the bracket 32. A portion of the buckle 40 may be disposed outside of the aperture 60 at the second end 64 of the receptacle 58, as shown in FIG. 2, allowing for ease of access to the buckle 40 by the occupant O, improved visibility of the buckle 40, etc. However, in other embodiments the buckle 40 may be entirely disposed within the aperture 60. Furthermore, in other embodiments the buckle 40 may be fully disposed outside of the receptacle 58, with the bracket 32 disposed within the aperture 60 and engaging the receptacle 58.

The receptacle 58 has a shoulder 66 at the first end 62 of the receptacle 58 configured to abut the chassis 36 and support the receptacle 58. More specifically, the receptacle 58 may further include a body 68 extending between the first end 62 and the second end 64, and a support flange 70 extending radially from the body 68 and lateral to the axis A at the first end 62 of the receptacle 58. The shoulder 66 may be at least partially defined by the support flange 70. As shown in FIG. 2, the support flange 70 may at least partially surround the aperture 60 and widens the overall footprint of the receptacle 58 along the chassis 36 to provide flexural support to the buckle 40 and the bracket 32. The receptacle 58 may further include ribs 71 extending between the body 68 and the support flange 70 further strengthen the rigidity of the connection between the body 68 and the support flange 70.

The seat belt buckle assembly 20 may further include a second bracket 72 extending along the first portion 34 of the bracket 32 and configured to be fixed to the chassis 36 of the vehicle 24 at the fastener interface 50 and a second buckle 74 mounted to the second bracket 72. The second bracket 72 and the second buckle 74 may be configured for use with the seat 29, described above. The second buckle 74 may be similar to the buckle 40 as described above and may be configured to couple with a second seat belt 76, as shown in FIG. 1. Alternatively, the configuration of the second buckle 74 may be different from the configuration of the buckle 40. For example, the second seat belt 76 may include a releasable anchor tongue that is configured to be selectively coupled with the second buckle 74. The releasable anchor tongue may allow the second seat belt 76 be fully retracted for allowing stowing of the seat 29 (e.g., a center seat in second row or third row of a vehicle, which is configured to fold into a stowed configuration). It is to be appreciated that the second buckle 74 may have any suitable configuration for use with the second seat belt 76. Furthermore, the second bracket 72 may be formed a similar material and in a similar manner to the bracket 32 as described above.

With reference to FIGS. 2 and 3, the receptacle 58 may define a second aperture 78 extending therethrough, with the second buckle 74 at least partially disposed within the second aperture 78 and held by the receptacle 58 for spatially locating the second buckle 74 within the vehicle 24. The second aperture 78 may extend parallel to the aperture 60, such that the buckle 40 and the second buckle 74 are disposed adjacent one another (e.g., side-by-side) while separated from one another by receptacle 58. In doing so, the receptacle 58 may prevent NVH between the buckle 40 and the second buckle 74.

It is to be appreciated that configurations and characteristics of the second buckle 74, the second aperture 78, and the second bracket 72, may correspond with the configurations and characteristics of the buckle 40, aperture 60, and bracket 32 described above. For example, the receptacle 58 and the second buckle 74 may have an interference fit within the second aperture 78 to prevent NVH between the second buckle 74 and the receptacle 58.

The first portion 34 of the bracket 32 may define an opening 80 and the second bracket 72 may extend from the fastener interface 50 through the opening 80 to position the second buckle 74 in the second aperture 78. Accordingly, both the bracket 32 and the second bracket 72 allow the buckle 40 and the second buckle 74, respectively, to be offset from the fastener interface 50 and may provide similar strength and deformation characteristics to the buckle 40 and the second buckle 74. Furthermore, the opening 80 may aligned between the second buckle 74 and the fastener interface 50 to allow a substantially direct path therebetween. The opening 80 may also be positioned to allow the second bracket 72 to lie along the first portion 34 of the bracket 32, further allowing for similar strength and deformation characteristics between the bracket 32 and the second bracket 72.

The seat belt buckle assembly 20 may further include webbing extending between and mounted to each of the second bracket 72 and the second buckle 74. More specifically, the second bracket 72 may extend between a pair of ends, with the second bracket 72 fixed to the chassis 36 through the fastener interface 50 at one of the ends and with the second bracket 72 mounted to the webbing at the other one of the pair of ends. Moreover, the second bracket 72 may define a hole 82 through which the webbing may be looped therethrough and secured to the second bracket 72. It is to be appreciate that the webbing may be mounted to the second bracket 72 in any suitable manner. Furthermore, the webbing may be secured to the second buckle 74 in any suitable manner. The webbing may allow for flexibility in location and the assembly of the second buckle 74 to the chassis 36, while the second bracket 72 may provide the strength and deformation characteristics as described above.

It should now be understood that embodiments of the present disclosure are directed to a seat belt buckle assembly for use with a seat belt of a vehicle that include a bracket having a first portion configured to be fixed to a chassis of the vehicle and a second portion extending from the first portion away from the chassis. The seat belt buckle assembly further includes a buckle mounted to the second portion of the bracket and configured to selectively couple with a tongue of the seat belt. The bracket is configured to restrain motion of the buckle during a vehicle event. The seat belt buckle assembly further includes a receptacle defining an aperture extending therethrough, with the buckle at least partially disposed within the aperture and held by the receptacle for spatially locating the buckle within the vehicle. The bracket is configured to restrain motion of the buckle during a vehicle event by deforming to absorb energy from the vehicle event. Furthermore, the buckle is held by the receptacle for spatially locating the buckle within the vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A seat belt buckle assembly for use with a seat belt of a vehicle, the seat belt buckle assembly comprising:

a bracket having a first portion configured to be fixed to a chassis of the vehicle and a second portion extending from the first portion away from the chassis;

a buckle directly mounted to the second portion of the bracket and configured to selectively couple with a tongue of the seat belt, wherein the bracket is configured to restrain motion of the buckle during a vehicle event; and a receptacle defining an aperture extending therethrough between a first end and a second end of the receptacle, with the buckle at least partially disposed within the aperture and circumferentially surrounded by the receptacle, the buckle held by the receptacle for spatially locating the buckle within the vehicle, the second portion of the bracket extending into the receptacle from the first end.

2. The seat belt buckle assembly of claim 1, wherein a portion of the buckle is disposed outside of the aperture at the second end of the receptacle.

3. The seat belt buckle assembly of claim 1, wherein the receptacle has a shoulder at the first end of the receptacle configured to abut the chassis and support the receptacle.

4. The seat belt buckle assembly of claim 1, wherein the first portion of the bracket comprises a flange configured to lie along the chassis and support the buckle.

5. The seat belt buckle assembly of claim 4, wherein the buckle and the second portion of the bracket are aligned along an axis, with the flange of the first portion of the bracket extending laterally from the axis.

6. The seat belt buckle assembly of claim 1, wherein the buckle and the second portion of the bracket are aligned along an axis, with the first portion of the bracket comprising a fastener interface laterally spaced from the axis and configured to fix the bracket to the chassis.

7. The seat belt buckle assembly of claim 6, further comprising:

a second bracket extending along the first portion of the bracket and configured to be fixed to the chassis of the vehicle at the fastener interface; and a second buckle mounted to the second bracket, wherein the receptacle defines a second aperture extending therethrough, with the second buckle at least partially disposed within the second aperture and held by the receptacle for spatially locating the second buckle within the vehicle.

8. The seat belt buckle assembly of claim 7, wherein the first portion of the bracket defines an opening and the second bracket extends from the fastener interface through the opening to position the second buckle in the second aperture.

9. The seat belt buckle assembly of claim 8, further comprising webbing extending between and mounted to each of the second bracket and the second buckle.

10. A seat belt buckle assembly for use with a seat belt of a vehicle, the seat belt buckle assembly comprising:

a bracket having a first portion configured to be fixed to a chassis of the vehicle and a second portion extending from the first portion away from the chassis;

a buckle mounted to the second portion of the bracket and configured to selectively couple with a tongue of the seat belt, wherein the bracket is configured to restrain motion of the buckle during a vehicle event; and a receptacle defining an aperture extending therethrough, with the buckle at least partially disposed within the aperture and held by the receptacle for spatially locating the buckle within the vehicle, the aperture extending between a first end and a second end of the receptacle, the second portion of the bracket extending into the receptacle from the first end, and the receptacle having a shoulder at the first end of the receptacle configured to abut the chassis and support the receptacle.

11. The seat belt buckle assembly of claim 10, wherein a portion of the buckle is disposed outside of the aperture at the second end of the receptacle.

12. The seat belt buckle assembly of claim 10, wherein the first portion of the bracket comprises a flange configured to lie along the chassis and support the buckle.

13. The seat belt buckle assembly of claim 12, wherein the buckle and the second portion of the bracket are aligned along an axis, with the flange of the first portion of the bracket extending laterally from the axis.

14. The seat belt buckle assembly of claim 10, wherein the buckle and the second portion of the bracket are aligned along an axis, with the first portion of the bracket comprising a fastener interface laterally spaced from the axis and configured to fix the bracket to the chassis.

15. A seat belt buckle assembly for use with a seat belt of a vehicle, the seat belt buckle assembly comprising:

a bracket having a first portion configured to be fixed to a chassis of the vehicle and a second portion extending from the first portion away from the chassis;

a buckle mounted to the second portion of the bracket and configured to selectively couple with a tongue of the seat belt, the buckle and the second portion of the bracket being aligned along an axis, with the first portion of the bracket comprising a fastener interface laterally spaced from the axis and configured to fix the bracket to the chassis, wherein the bracket is configured to restrain motion of the buckle during a vehicle event;

a receptacle defining an aperture extending therethrough, with the buckle at least partially disposed within the aperture and held by the receptacle for spatially locating the buckle within the vehicle;

a second bracket extending along the first portion of the bracket and configured to be fixed to the chassis of the vehicle at the fastener interface; and a second buckle mounted to the second bracket, wherein the receptacle defines a second aperture extending therethrough, with the second buckle at least partially disposed within the second aperture and held by the receptacle for spatially locating the second buckle within the vehicle.

16. The seat belt buckle assembly of claim 15, wherein the aperture extends between a first end and a second end of the receptacle, wherein the second portion of the bracket extends into the receptacle from the first end.

17. The seat belt buckle assembly of claim 15, wherein the first portion of the bracket comprises a flange configured to lie along the chassis and support the buckle.

18. The seat belt buckle assembly of claim 15, wherein the first portion of the bracket defines an opening and the second bracket extends from the fastener interface through the opening to position the second buckle in the second aperture.

19. The seat belt buckle assembly of claim 18, further comprising webbing extending between and mounted to each of the second bracket and the second buckle.

* * * * *